Sept. 26, 1967    H. VINKELOE    3,343,215
DEFLECTING EXTRUDER HEAD
Filed April 23, 1965
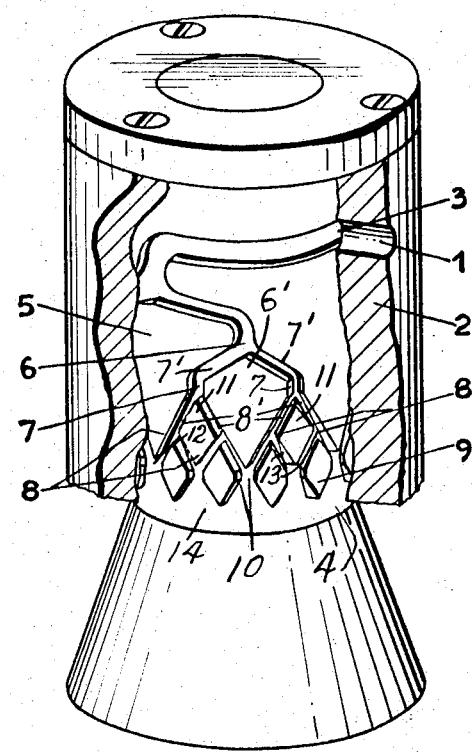
INVENTOR.
HEINZ VINKELOE
BY Otto John Munz.
Attorney United States Patent Office 3,343,215
Patented Sept. 26, 1967

3,343,215
DEFLECTING EXTRUDER HEAD
Heinz Vinkeloe, Remscheid-Lennep, Germany, assignor to Barmer Maschinenfabrik Aktiengesellschaft
Filed Apr. 23, 1965, Ser. No. 450,337
5 Claims. (Cl. 18—14)

This invention relates to an apparatus for the extrusion of plastic materials. More particularly, this invention relates to a deflecting and cross extruder head which is suitable for the manufacture of tubes, tubular film, and cable sheaths, especially those having larger diameters, from thermoplastic materials.

In the extrusion of tubular films having a large diameter, it is necessary to deflect the stream of plastic material issuing from the material inlet channel, which is usually horizontal, into a direction which is preferably perpendicular to the axis of the inlet channel. Deflecting or cross extruder heads are employed for this purpose. It is of paramount importance that, after the deflection, the flow velocity of the melt at all points in a radial plane about the new axis be the same. In other words, the molten plastic, before it issues from the annular nozzle, should have over its entire circumference a highly uniform pressure, temperature, flow velocity and viscosity. If a greater uniformity of these conditions is obtained, the quality of the products is improved, and tubular articles having wall thicknesses which are uniformly within narrower tolerances can be produced.

In efforts made to meet these requirements, difficulties are frequently encountered due to the fact that a change in the direction of flow of a material inherently causes different portions of the material to flow through paths having differing lengths.

One of the best known means which has been employed to equalize the lengths of the flow paths comprises the use of a heart-shaped insert, called a heart piece, which is placed on the surface of the mandrel on the side facing the material inlet channel. On the opposite side of the mandrel, a tongue-shaped insert, called a tongue piece, is arranged on the surface of the mandrel. The tips of the heart piece and the tongue piece point toward the outlet orifice. By this device the flow paths of the plastic material issuing from the nozzle nearest and farthest the inlet channel are made the same. This system has a limited effectiveness since it affects only a small portion of the flow area and therefore achieves no substantial influence over the flow of plastic over the entire circumference of the mandrel.

In one type of deflecting extruder head, which is easy to manufacture and is particularly suitable for the production of blown films, the fluid plastic entering the inlet channel from the worm is first collected in an annular channel surrounding the mandrel. It is then forced toward the outlet nozzle through an annular space which is coaxial with the annular channel. A bore extending from the inlet channel through the mandrel connects the side of the annular channel nearest the inlet channel with the diametrically opposite side in order to prevent the formation of a "dead corner" at this point. The pressure differential between portions of plastic material at different locations along the annular channel is reduced by this design, but it does not provide a complete pressure equalization. Also, this design is not practical for providing products having wall thicknesses which are uniform within narrow tolerances. The mandrel is unsupported over its necessarily great overall length and is easily displaced laterally. Displacement of the mandrel to an undesirable eccentric position in the outlet of the extruder head causes a different shearing effect in the material flowing at different points along the circumference of the mandrel, which in turn results in viscosity differences in the extruded material. This produces very high, undesirable stresses, particularly in blown film, and reduces the quality of the products for further treatment such as bonding and printing. This design has another very important disadvantage if an axial bore through the mandrel is desired. If such a bore can be provided at all, it must have a small diameter and must be located eccentrically with respect to the axis of mandrel in order to avoid passing through the bore extending from the material inlet channel through the mandrel.

Another device which has been suggested provides a multiple-branched feed channel, arranged between the inlet channel and the outlet nozzle, by dividing the respective material streams into two symmetrical smaller streams, whose successive portions are arranged in several superimposed planes. This branched system is used in wide slot extruder heads for the production of sheets and flat films. The arrangement of the distributor in several planes cannot be readily adapted to deflecting extruder heads for blown films since the resulting extruder head would be much too large and expensive.

The primary object of this invention is to provide an apparatus of the type described which is capable of forming high quality products which have uniform wall thicknesses within very close tolerances.

Another object of the present invention is to provide an apparatus of the type described which is capable of delivering plastic material to the exit nozzle under a rigorously controlled uniform pressure and with a rigorously controlled temperature, flow velocity and viscosity.

Yet another object of this invention is to provide a deflecting and cross extruder head having an extruder housing and a mandrel arranged concentrically therein, a substantially horizontal material inlet channel terminating in a space between the housing and the mandrel, a distributing means for splitting the incoming material into two symmetrical streams and repeatedly splitting the partial streams into further pairs of symmetrical streams whereby a plurality of smaller, uniform streams of material are obtained flowing in a direction generally perpendicular to the axis of the material inlet channel, said distributing means also including means for collecting said smaller streams into a stream having an annular cross-section for the production of tubes, tubular films, and cable sheaths.

The figure shows an embodiment of the deflecting and cross extruder head of this invention, and illustrates the mandrel and a portion of the distributing system through a partial section through the housing.

The material inlet channel 1 is arranged for axial alignment with the screw outlet of an extruder. The inlet channel 1 terminates at and communicates with channel 3 between the housing 2 and the mandrel 4. The stream of material passing through inlet channel 1 is divided into two partial streams when it enters channel 3. Channel 3 extends from both the left and right of channel 1, preferably in a plane which is perpendicular to the mandrel axis, and both the left and right extensions of channel 3 each extend around about a quarter of the circumference of the mandrel. The ends of the channel 3 remote from the inlet 1 thus are diametrically opposite each other. The two extensions of channel 3 and the related distribution system are symmetrical with respect to the inlet channel 1. Each extension of channel 3 is deflected into a new direction at its end, and each new channel is immediately divided into two equal, smaller channels defining and separated by flow islands 5. Each smaller channel is again divided at 6 into two equal, smaller channels defining and separated by flow islands 6'. The entire distribution system has four points 6 and island 6' evenly distributed around the circumference of the mandrel 4. The eight smaller channels 7' extending from points 6 are deflected into sixteen new channels 8' at 7. The channels 8' occur in downwardly diverging pairs and between the channels of each such pair are arranged a group of three flow islands, namely, a lower pair of islands 9 and an upper island 11. The channels 8' extend past the remote sides of the associated islands 9 and each channel 8' meets the channel 8' of the next associated pair at 12. Between the lower faces of each island 11 and the adjacent faces of the associated pair of islands 9 are formed channels 13 supplying molten material to the space between the islands 9 of each pair. This assists in the uniform distribution of material.

For fluid dynamic reasons such as alignment of plan with the axial direction, the flow islands 9 thus are so designed that pairs of adjacent streams 13 of plastic flowing in 32 channels are combined into 16 streams distributed around the entire circumference of the mandrel in the space 14 beneath the islands 9. The flow islands 9 align the material flow precisely by means of their side faces 10 which can also be longer than shown in FIG. 1. The islands 9 and 11, except for the side faces 10, are substantially diamond shaped to provide straight passages for the flow of plastic therebetween and therearound, thus reducing the force necessary to maintain the flow of plastic. The pressure, temperature, viscosity, and velocity of flow of the plastic material is uniform over the entire circumference after the deflection is completed.

From a manufacturing viewpoint, the arrangement of the distributor system on the surface of the mandrel is particularly advantageous. First the mandrel need be provided only with a smooth, easily produced surface. Then the flow channels can be cut into the surface. Then the surface of the mandrel is conventionally finished by circular grinding, thus insuring a tight fit between the surfaces of the flow islands and the inner wall of the extruder head housing. Therefore, the mandrel can be safely and centrally supported in the extruder housing over a major portion of its length.

For the manufacture of tubular films with even greater diameters, it is advisable to increase the number of branching steps and thus the number of individual channels in the distribution system. The preferred manner of forming the channels has been described. Obviously, however, the flow channels can be formed in the inner surface of the extruder head by known grinding methods, or the channels could be formed by attaching preformed flow islands to the surface of the mandrel or the inner surface of the extruder housing.

This invention is a solution to the problem of feeding a stream of fluid plastic material to the outlet nozzle of an extruder by means of a suitable distribution system in deflecting and cross extruder heads for the production of tubes, tubular films and cable sheaths. In the device of this invention, the pressure, temperature, viscosity, and velocity values of the plastic material are completely uniform over the entire circumference of the annular nozzle whereby a product is produced having a wall thickness which is uniform within very narrow tolerances.

In order to obtain this result, it is shown according to this invention that the distributor system which consists in a known manner of flow islands and of flow channels, be evenly distributed on the circumference of the mandrel surface. It is also shown that all flow islands can be firmly secured on the surface of the mandrel as mandrel supports. Also, an additional number of identical flow islands can be arranged below the distributor system on the surface of the mandrel, and these additional flow islands can be located so that the terminal edges of the flow islands of the distributor system are between their sides where the distance therebetween is shortest.

The advantage of equal path lengths from the material inlet to the nozzle exit, achieved by the use of this branched system, may also be suitable for other extrusion tools with wide slot-nozzles such as are used for the production of sheets and flat films. However, it is particularly important for deflecting and cross extruder heads because of the fact that the material flow is deflected from the feed direction into a completely new flow direction with paths of equal length for all portions of the deflected stream. A particularly important factor which favors the arrangement of the branched system on the surface of the mandrel, particularly for the manufacture of tubular films, is that the mandrel is well supported by the islands. The islands maintain proper alignment of the mandrel, keeping it well centered and preventing uncontrolled flow over the islands. All flow islands fixed on the mandrel surface bear against the inner wall of the extruder housing and act as supports for the mandrel. In this way, the centricity of the annular outlet orifice of the nozzle is maintained.

Since the flow channels extending in the mandrel surface are shallow and therefore penetrate only slightly into the mandrel, the latter can be provided with a readily accessible, central, axial bore having a large diameter, so that structural elements, for example elements for calibrating or for the mechanical stretching or spreading of the tubular film, can be easily introduced through them into the interior of the tube. The central position of the mandrel and the uniform distribution of the temperature, pressure, viscosity, and velocity values of the plastic along its circumference, as well as the possibility of introducing necessary structural elements into the interior of the foil tube, insure a uniformity in the wall thickness and a high quality end product in every respect.

Longitudinal markings, which tend to appear in the end product due to the action of the flow islands on the fluid plastic are eliminated and blurred by the device of this invention. This result is obtained by arranging the flow islands unsymmetrically with respect to the channels in whose outlet end the flow islands are located. Also, the trailing edges of these flow islands are laterally displaced along the mandrel circumference with respect to the leading edges.

Obviously, many variations and modifications of the extruder head as hereinabove described can be made within the scope of this invention, and only such limitations should be applied as are indicated in the claims.

I claim:

1. A deflecting and cross extruder head comprising a housing having as its internal surface a surface of revolution described by the revolution of a line about an axis, a mandrel arranged within said housing, said mandrel having an outer surface fitting onto the internal surface of said housing, a semi-circular channel formed between said mandrel and said housing near one each thereof and lying in a plane perpendicular to said axis of said housing, said housing having an inlet opening communicating with said channel centrally of the ends thereof; separate distributing channel systems stemming from each end of said semi-circular channel, there being one system stemming from each end, said systems progressively and symmetrically forking in the interface between housing and mantel in the axial direction until said forking has resulted in a predetermined number of channels separated equidistantly on a circle around said interface; and a plurality of islands equal in number to said predetermined number, one of said islands being situated in each of said channels of predetermined number, each of said islands abutting against the internal surface of the housing and the outer surface of the mantel.

2. Apparatus according to claim 1 wherein said systems are symmetrically arranged entirely around the circumference of said mandrel.

3. Apparatus according to claim 1 wherein the spaces between adjacent islands from outlet ducts and are fed from two of said channels of predetermined number.

4. Apparatus according to claim 1 wherein said systems result from diamond-shaped dividers having axially aligned diagonals and wherein said islands comprise equally spaced, axially aligned, congruent diamonds.

5. Apparatus according to claim 4 wherein every other divider before said islands is congruent with said islands.

References Cited

UNITED STATES PATENTS

| | | | |
|---|---|---|---|
| 2,025,666 | 12/1935 | Hanff. | |
| 2,734,224 | 2/1956 | Winstead | 18—12 |
| 2,820,249 | 1/1958 | Colombo | 18—13 |
| 3,029,474 | 4/1962 | Voigt et el. | 18—14 |
| 3,065,502 | 11/1962 | Lorenian. | |

WILLIAM J. STEPHENSON, *Primary Examnier.*